United States Patent
Karp et al.

(10) Patent No.: US 12,041,405 B2
(45) Date of Patent: Jul. 16, 2024

(54) INTEGRATED HEADSET CONTROLLER STORAGE AND CONNECTION

(71) Applicant: Sony Interactive Entertainment Inc., Tokyo (JP)

(72) Inventors: Sarah Karp, San Mateo, CA (US); Darice Lee, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 141 days.

(21) Appl. No.: 17/715,675

(22) Filed: Apr. 7, 2022

(65) Prior Publication Data

US 2023/0328419 A1 Oct. 12, 2023

(51) Int. Cl.
*H04R 1/10* (2006.01)
*H04M 1/60* (2006.01)

(52) U.S. Cl.
CPC ........ *H04R 1/1016* (2013.01); *H04M 1/6066* (2013.01); *H04R 1/1025* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 6,881,147 B2* | 4/2005 | Naghi | A63F 13/24 463/36 |
| 10,455,066 B2 | 10/2019 | Kim | |
| 10,589,169 B2* | 3/2020 | Komori | A63F 13/23 |
| 11,000,759 B2* | 5/2021 | Palmer | G06F 3/0338 |
| 11,172,101 B1 | 11/2021 | Boozer et al. | |
| 11,524,227 B1* | 12/2022 | Lee | H04R 1/1025 |
| 2013/0198273 A1* | 8/2013 | Vago | A63F 13/327 709/203 |
| 2018/0091884 A1 | 3/2018 | Minoo et al. | |
| 2018/0207523 A1* | 7/2018 | Lyden | A63F 13/214 |
| 2018/0262826 A1* | 9/2018 | Ingram | H04B 1/3883 |
| 2019/0268680 A1 | 8/2019 | Solum et al. | |
| 2019/0273980 A1 | 9/2019 | Hardi et al. | |
| 2020/0068286 A1* | 2/2020 | Schrems | H04R 1/1016 |
| 2022/0043624 A1 | 2/2022 | Rajasekaran | |

FOREIGN PATENT DOCUMENTS

| | | |
|---|---|---|
| CN | 113274739 A | 8/2021 |
| KR | 20210072375 A | 6/2021 |

OTHER PUBLICATIONS

Invitation to Pay Addi Fees;, PCT/US2023/065378, dated Jul. 6, 2023, 5 pages.

* cited by examiner

*Primary Examiner* — Paul W Huber
(74) *Attorney, Agent, or Firm* — PENILLA IP, APC (57) ABSTRACT

A controller for providing inputs to an interactive application includes a first surface with a pair of slots to store earbuds, a plurality of control buttons and touch input surfaces defined on one or more surfaces including the first surface. A processor is configured to pair the controller to a computing device executing the interactive application and is coupled to each of the slots so as to pair the earbuds received therein to the controller and to share the pairing between the controller and the computing device with the earbuds received in the pair of slots.

20 Claims, 6 Drawing Sheets

INTEGRATED HEADSET CONTROLLER STORAGE AND CONNECTION

TECHNICAL FIELD

The present disclosure relates to a controller used to provide input to an interactive application and more particularly to a controller that provides storage, charging, and connection case for in-ear headphones.

BACKGROUND OF THE DISCLOSURE

Video games have grown in popularity over recent years. With the growing popularity of the video games, various input/output devices have been developed to assist the users in interacting with the video games (i.e., interactive applications). For example, gaming controllers were developed to assist the users in providing inputs to the video games and to receive feedback responses. Head-mounted display with display screens were developed and provided to allow the users to have immersive, private and non-intrusive gaming experience. Headphones (in-ear headphones as well as external headphones) were developed and provided to allow the users to listen to audio of the video games and to interact with other users within and outside of the video game, etc. The in-ear headphones (i.e., earbuds), for example, can be wired or wireless. The wireless earbuds provide a small and portable form factor for listening to both in-game and external audio during gameplay of a video game. The earbuds are stored in a separate case and charged via electrical coupling provided in the case. To allow use of the various input/output devices for providing inputs and receiving outputs, the various devices have to be paired to a gaming device.

As more and more input/output devices are made available to users, users are burdened with managing the pairing, storing, and charging of these devices. Managing the various input/output devices is time consuming and involved process. For example, in the current setup, users need to manage two separate pairing processes (i.e., for pairing both the controller and the earbuds) to successfully pair the earbuds and the controller to a gaming device. The gaming device is used to execute the video game using user inputs provided through the input/output devices and to provide game content for rendering on a display screen of a client device of each user. In addition to performing two separate pairing processes, the users also have to keep track of two separate battery life statuses in order to ensure the earbuds, the case of the earbuds, and the controller are charged and ready for gameplay. Additionally, the locations of the earbuds and the controller have to be tracked at all times. As portability and gaming anywhere becomes more and more mainstream and important, the audio experience also becomes equally important.

It is in this context that embodiments of the disclosure arise.

SUMMARY

Implementations of the present disclosure relate to devices, systems and methods for storing, charging and pairing in-ear headphones (i.e., earbuds) to a controller used in providing inputs to a video game. The controller is paired to a gaming device, such as a gaming console or a gaming server that executes interactive application, such as the video game. The controller is designed to act both as an input device and as a headphone storage, charging, and connection case. Using the controller as a headphone case and an earbud charger eliminates the need to manage two separate devices. This simplifies the overall user experience as the user has one less device to manage communication with the gaming device. Using the controller for audio storage (i.e., earbud storage) and integrating earbuds into the controller itself provides a proprietary low-latency audio connection to the gaming device, charging space within the controller, and provides the ability to switch to the built-in battery or power source of the controller when the internal power source (e.g., battery) of the earbuds runs out of power.

Further, using the controller as an earbud case, communication between the two devices (earbuds and the controller) is greatly simplified, thereby allowing for greater opportunity for the earbuds and the controller to work together. With two different audio sources available at the controller, the user is provided with greater flexibility to direct specific ones of the audio through each microphone source. In addition to simplifying the pairing, storing and charging of the earbuds, the microphone/speaker of the controller can be used with the earbuds to triangulate the audio source so that the audio can be processed to provide better audio quality. For example, the triangulation of the audio source can be used to precisely identify and cancel extraneous noise and for selective filtering out of certain ones of the ambient sounds and enhancing certain other ones of the ambient sounds.

In one implementation, a controller to provide inputs to an interactive application is disclosed. The controller includes a first surface with a pair of slots defined thereon. Each slot of the pair of slots is configured to store an earbud. Each slot is coupled to a power source of the controller to charge said earbud when the earbud is received in each slot of said pair of slots. The controller also includes a plurality of control buttons and one or more touch input surfaces defined on one or more surfaces, including the first surface. Each of the plurality of control buttons and each of the one or more touch input surfaces is configured to provide an input for performing an action in the interactive application. A processor is configured to pair the controller to a computing device executing the interactive application. The processor is also coupled to each of the slots so as to pair the earbuds received therein to the controller and to share the pairing between the controller and the computing device with the earbuds received in the pair of slots.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As portability and gaming anywhere becomes mainstream and important, so does the audio experience using microphones paired with a computing device (e.g., game console or gaming server). The computing device used for executing an interactive application, such as a video game, is associated with one or more input devices to allow a user to provide input to the video game. Some of the input devices available for providing inputs (e.g., control inputs) include keyboard, mouse, gaming controller (simply referred to as a "controller"), tablet computing device with touch screen or an emulated controller, a mobile computing device, etc. In addition to the aforementioned input devices for providing control inputs, voice inputs (e.g., commands) may be provided using microphones of the controller, microphones associated with a display screen/computing device or microphones associated with a pair of earbuds. The inputs are used to update a game state of the video game and game related content corresponding to the game state is generated and provided for rendering. Game related content of the video game includes game content and social interaction content, such as chat content. The game content further includes video content, haptic content, audio content, etc. The video content is forwarded to a display screen associated with the computing device or a head mounted display, or to a television monitor or a display surface for rendering. The audio content is forwarded to the controller for rendering via speaker(s) of the controller, or to a pair of earbuds that are communicatively paired to the computing device for rendering via the speakers of the earbuds.

In various implementations described herein, the pair of earbuds is integrally stored in an earbud case defined on a surface of the controller. This allows the earbuds to, (a) share a power source used to charge the controller, (b) communicate with the computing device using a communication connection established from the pairing of the controller to the computing device; (c) provide a proprietary low-latency audio connection between the earbuds and the computing device; (d) provide greater flexibility to configure the earbuds to selectively receive different audio content; (e) simplify the pairing of the earbuds to the computing device; (f) simplify the gaming-centric headset storage by reducing number of devices to track; (g) simplify the communication between the microphones/speakers of the earbuds and the controller.

With the general understanding of the disclosure, specific details of the disclosure will now be described with reference to the various figures.

Figure 1:
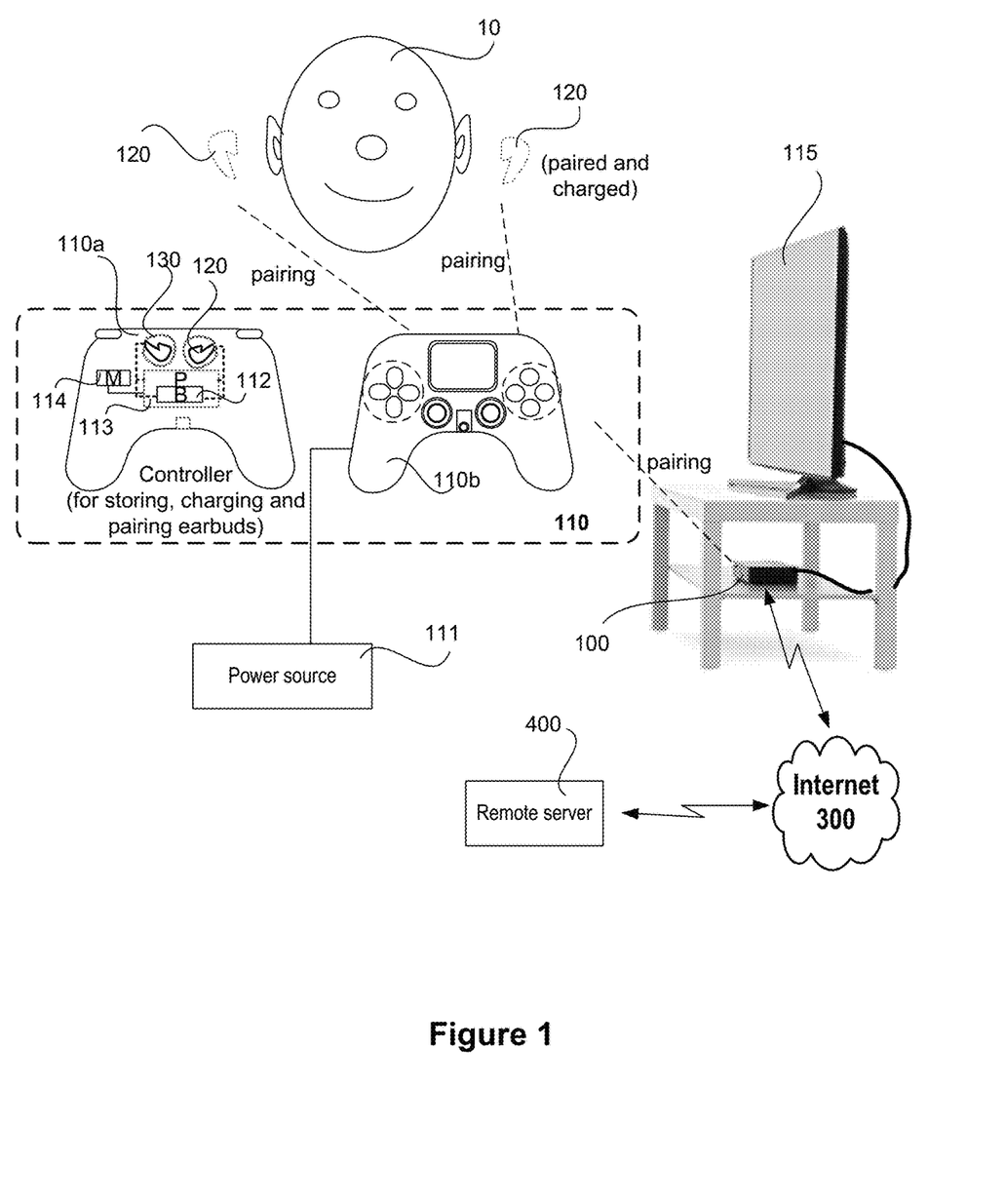
FIG. 1 illustrates a simplified block diagram of a gaming system with a controller having an earbud storage to store and charge the earbuds received therein, and to share the pairing of the controller to a computing device to communicate with the computing device, in accordance with one implementation of the present disclosure.

FIG. 1 illustrates a simplified block diagram of a system that is used to execute an interactive application, such as a video game, and provide content of the interactive application to one or more client devices for rendering, in one implementation. The system shown in FIG. 1 shows a gaming system in which a controller 110 is used to provide user inputs to an interactive application (e.g., the video game) executing on a computing device 100. The system shown in FIG. 1 has been deliberately kept simple and basic in order to understand the advantages of the disclosure described herein. The system, as shown, includes the computing device 100 (represented as a gaming console), a display screen 115, a controller 110, and a pair of earbuds 120. In the implementation of FIG. 1, the computing device 100 is shown to be co-located with the user 10 providing input through the controller 110. The computing device 100 does not have to be co-located but can also be remotely located. The computing device 100 is communicatively connected to the controller 110 by performing a pairing process so as to receive user input provided through the controller 110 and return video game content for rendering on the display screen 115. Throughout this application, the controller may be alternatively referred to as a "client device".

The computing device 100 is not restricted to a stand-alone gaming console but can be a connected device, such as a thin client, or a local server device that is communicatively connected to a remote server, such as a cloud server 400 of a game cloud, or can be a remotely located cloud server that is part of the game cloud. In some implementations where the computing device 100 is connected to the cloud server 400, a first portion of the video game may be executed on the computing device 100 and a second portion of the video game may be executed on the cloud server 400. In these implementations, some of the input from the controller 110 to the video game and some of the game content generated for the video game are processed at the computing device 100 and the remaining portion of the input and the game content are processed at the cloud server 400. In such cases, the game state of the video game is synchronized between the computing device 100 and the cloud server 400. In the implementations where the computing device 100 is a thin client that is communicatively connected to the cloud server, the computing device 100 only acts as an intermediary to transmit game input from the controller 110 to the cloud server 400 and forward game content generated at the cloud server 400 to the display screen 115 associated with the computing device 100 for rendering. In these implementations, all the processing occurs at the cloud server 400.

The game content of the video game returned by the computing device 100 are rendered on the display screen 115. The display screen can be a television monitor as shown or a screen associated with the computing device (not shown) or a screen of a head-mounted display (not shown) or an external display surface (not shown) on which the content can be rendered.

The controller 110 is shown to include a pair of handles operable using both hands of the user. The type of controller is not restricted to the aforementioned type but can include a single handle operable using a single hand of a user or a controller without any handles, such as a tablet computing device or game pad, for example. The controller 110 includes a plurality of control buttons and/or one or more touch screen interface(s) (e.g., touch input interface) defined one or more surfaces to provide user inputs to the video game (i.e., an interactive application). FIG. 1 shows a view of both a back side 110a and a front side 110b of the controller 110. The back side 110a of the controller 110 shows a first surface (i.e., a back surface) on which a pair of slots 130 is defined for housing a pair of earbuds 120. The front side 110b shows a second surface (i.e., front surface) of the controller 110 on which a plurality of control buttons and touch screen interface are disposed. The surfaces of the controller 110 on which the control buttons and one or more touch screen interfaces are defined are not restricted to the front surface, but can also include a top surface, a bottom surface, side surfaces, and back surface. The user inputs are used to perform an action in the interactive application. The tablet computing device represents a controller and includes a touch screen interface on which control buttons of a physical controller are emulated. The controller 110 is communicatively paired to the computing device 100 so that the user inputs provided through the control buttons and/or touch screen interfaces can be detected and interpreted by the computing device 100 to affect game state of the video game. In some implementations, the pairing can be a high-speed pairing to avoid latency so that user inputs provided through the control buttons and/or touch screen interfaces to the computing device 100 and game content from the computing device 100 to the display screen 115 are transmitted in near real-time. A power source is used to charge the controller 110. The power source could be an internal power source, such as a battery 112, or an external power source 111. The controller 110 also includes microphone/speaker (not shown) to receive voice commands from the user and to render any audio generated during gameplay of the video game. The voice commands from the user can be used as user inputs to the video game or posted as a chat on a chat interface or social media input onto a social media application interface rendered alongside game content during game play of the video game. Similarly, the audio generated during gameplay can include game audio as well as chat/social media audio provided by users via the chat/social media application interface.

The pair of earbuds 120 can be included in addition to microphone/speaker of the controller 110 to provide audio commands and/or listen to audio generated during gameplay of the video game. The earbuds 120 are stored in an earbud case defined on one of the surfaces of the controller 110. The earbud case is defined as a pair of slots on the back side of the controller 110, in some implementations, and the earbuds 120 are received into the respective slots 130 to fully integrate the earbuds 120 with the controller 110.

The controller with the earbud storage integrated within is different from conventional controller. In the conventional controller, there is no storage for the earbuds defined on any surface. Instead, the earbuds were stored separately in an earbud case leading to the user having to track location of multiple devices, such as the earbuds, the earbud case and the controller. Further, because the earbuds and the controller are separate devices, the earbuds and the controller are separately connected to different or same power sources to get charged. As a result, the user has to separately manage battery life statuses of each of these devices to ensure that both these devices are sufficiently and timely charged and ready for game play, when needed. Additionally, the earbuds and the controller are each separately paired to the computing device to communicate with the computing device, and the earbuds are also paired to the controller in order to allow communication and synchronization between the controller and the earbuds. Consequently, the user has to manage the different pairing processes in addition to tracking the separate devices and the battery statuses of each of these devices. The user also has to ensure that the communication between the devices is managed properly.

Thus, in order to avoid duplication of connections, storage, and pairing, and to simplify the tracking of the devices and communication between the devices, the earbuds 120 are integrated into the controller 110. A pair of slots 130 is defined on a first surface of the controller 110 and a plurality of control buttons and/or one or more touch input surfaces are defined on a second surface. In one implementation, the first surface is the back side 110a of the controller 110 and the second surface is the front side 110b of the controller 110. Additional control buttons can be defined on other surfaces of the controller 110 including a top surface, a bottom surface, or one or both lateral surfaces of the controller 110. The integration of the earbuds 120 allows the earbuds 120 and the microphones/speakers of the controller 110 to work together, and simplifies the pairing process, tracking of devices and managing battery life statuses. The integration also allows greater flexibility of directing different audio content generated during the execution of the interactive application to different devices, thereby enhancing the overall user experience.

The pair of slots 130 is not restricted to be defined on the back side 110a of the controller 110 but can also be defined on other surfaces of the controller including the front side 110b, any one or both the lateral surfaces, the top surface or the bottom surface. In some implementations, each of the pair of slots 130 is defined to include a spring fit mechanism to receive and secure each earbud 120 into the respective slot 130. The spring fit mechanism is configured to allow the earbud 120 to be pressed into place within the slot 130 so as to be securely received into the slot 130. For example, the spring fit mechanism is designed to generate a mechanical click in response to a first press of the earbud 120 aligned over the slot to indicate that the earbud 120 is received properly (i.e., snapped into place) in the slot 130. Subsequent press of the earbud 120 would cause the earbud 120 to be released from the slot 130 (i.e., pop out of the slot). Other ways to indicate proper receipt of the earbud 120 in the slot 130 can also be employed. In alternate implementations, the slots 130 can be configured to be formed using conformal material or include one or more magnets or employ any other material or mechanism to securely receive the earbuds 120 into the respective slots 130. A size and shape of each slot 130 is defined to accommodate the earbud 120 so that the earbud 120, when received in the slot 130, is flush with the surface (e.g., back side 110a) of the controller 110 on which the slots 130 are defined.

To assist in storing and charging the earbuds 120 when received in the slots 130, in some implementations, each slot 130 includes one or more slot contacts (132 shown in FIG. 3A) defined in the bottom and coupled to a power source (e.g., internal power source 112 (i.e., battery)) of the controller 110. The slot contacts 132 of the controller 110, in turn, connect to one or more metallic conductor elements disposed on the earbuds 120 establishing an electrical metal connection. Each earbud 120 is defined by an earbud portion and a narrow tubular portion that extends down from a bottom surface of the earbud portion for a length. In some implementations, the metallic conductor elements are defined on a bottom surface of the narrow tubular portion of each earbud 120. The electrical connection allows the power from the power source (i.e., external power source 111 or internal power source 112) to flow to the earbuds 120 charging the earbuds 120. Each slot 130 is also coupled to a processor 113 of the controller 110 to allow the controller 110 to control communication between the earbuds 120 and the controller 110 and between the earbuds 120 and the computing device 100. The pair of earbuds 120 acts as an external audio source and the microphone/speaker of the controller 110 acts as an internal audio source.

The controller 110 is first paired to the computing device 100 during initial setup of the controller 110, and such pairing may be done using high speed connection. The controller 110 can be communicatively connected to the computing device 100 using wired or wireless connection. After the successful pairing of the controller 110 to the computing device 100, the earbuds 120 are paired to the controller 110. The pairing of the earbuds 120 to the controller 110 allows the earbuds 120 to share the pairing of the controller 110 to the computing device 100 to allow communication between earbuds 120 and the computing device 100. The communication of the earbuds 120 with the computing device 100 will use the high speed communication connection established by the controller 110. In some implementations, the earbuds 120 are connected to the controller 110 through wireless connection. In some implementations, the wireless connection may be a proprietary wireless connection or any other widely available wireless connection.

The controller 110 with the integrated earbud storage (i.e., slots 130) eliminates the need to have separate earbud case for storing and charging the earbuds 120. The gaming-centric headset storage is simplified by reducing the number of devices to track as only the controller 110 (with the earbuds integrated within) needs to be tracked. The integration of the earbuds 120 to the controller 110 also simplifies and reduces the number of pairing processes that needs to be done for using the earbuds 120 to communicate with the controller 110 and the computing device 100. In addition to reducing the pairing processes, the integration improves and simplifies the communication between the different devices. For instance, the pairing is initially done between the controller 110 and the computing device 100 to establish the communication connection there-between. After the successful pairing of the controller 110 with the computing device 100, the earbuds 120 are then paired with the controller 110. The pairing of the earbuds 120 to the controller 110 allows the earbuds 120 to communicate with computing device 100 using the already established communication connection between the controller 110 and the computing device 100. The earbuds 120 thus tap into the high speed communication connection between the controller 110 and the computing device 100 to provide and receive audio content. The earbuds can be configured to act as external audio source and work cohesively with the internal audio source (microphone/speaker) of the controller. The audio content generated during execution of interactive application can be processed, specific one of the audio identified and isolated using triangulation technique, or certain ones of ambient sound identified and filtered out or enhanced. The processed audio is forwarded to different devices for rendering, thereby allowing the user to have an enhanced user experience.

Further, the power from the controller 110 is shared with the earbuds 120, thereby eliminating the need to manage two different battery life statuses. Only the battery life and/or the power status of the controller 110 need to be managed. In addition to addressing the duplication of the pairing, storing and charging of the earbuds 120, the integration provides greater flexibility by allowing the earbuds 120 and the microphone/speaker of the controller 110 to be configured to work cohesively to stream different audios to different devices. The flexibility allows the user to control which ones of audio content to stream to the earbuds for private rendering and which ones of audio content to stream to the controller or the computing device/display screen for public rendering. The earbuds 120 can be set up and the processor 113 of the controller 110 can be configured to stream the chat audio to the different earbuds 120 for private rendering, and the game audio to the controller 110 and/or computing device 100 or display screen 115 for public rendering. The setting up of the earbuds 120 and the configuration of the processor 113 of the controller 110 may be done during initial setup, for or by the user, and dynamically updated during or after initial or each use. In some implementation, the earbuds setup and the processor configuration may be user-specific and/or interactive application-specific. More details of setting up of the earbuds 120 and managing streaming of different audio will be discussed in detail with reference to FIGS. 2A and 2B.

Figure 2A:
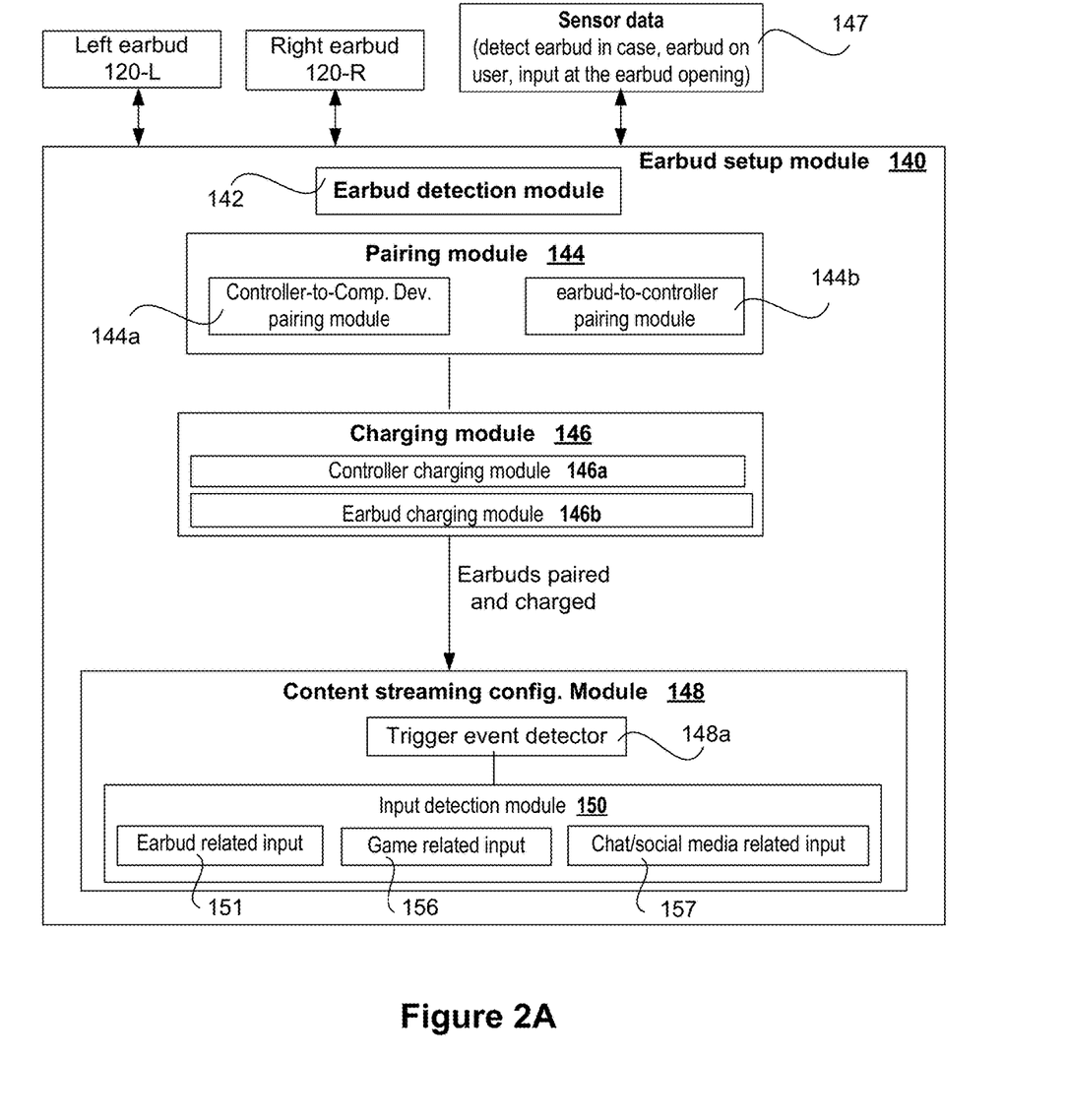
FIG. 2A illustrates a simplified block diagram of an earbud setup module used for charging the earbuds, pairing the earbuds to the controller and to communicate with computing device, such as a gaming device, in accordance with one implementation of the present disclosure.
Figure 2B:
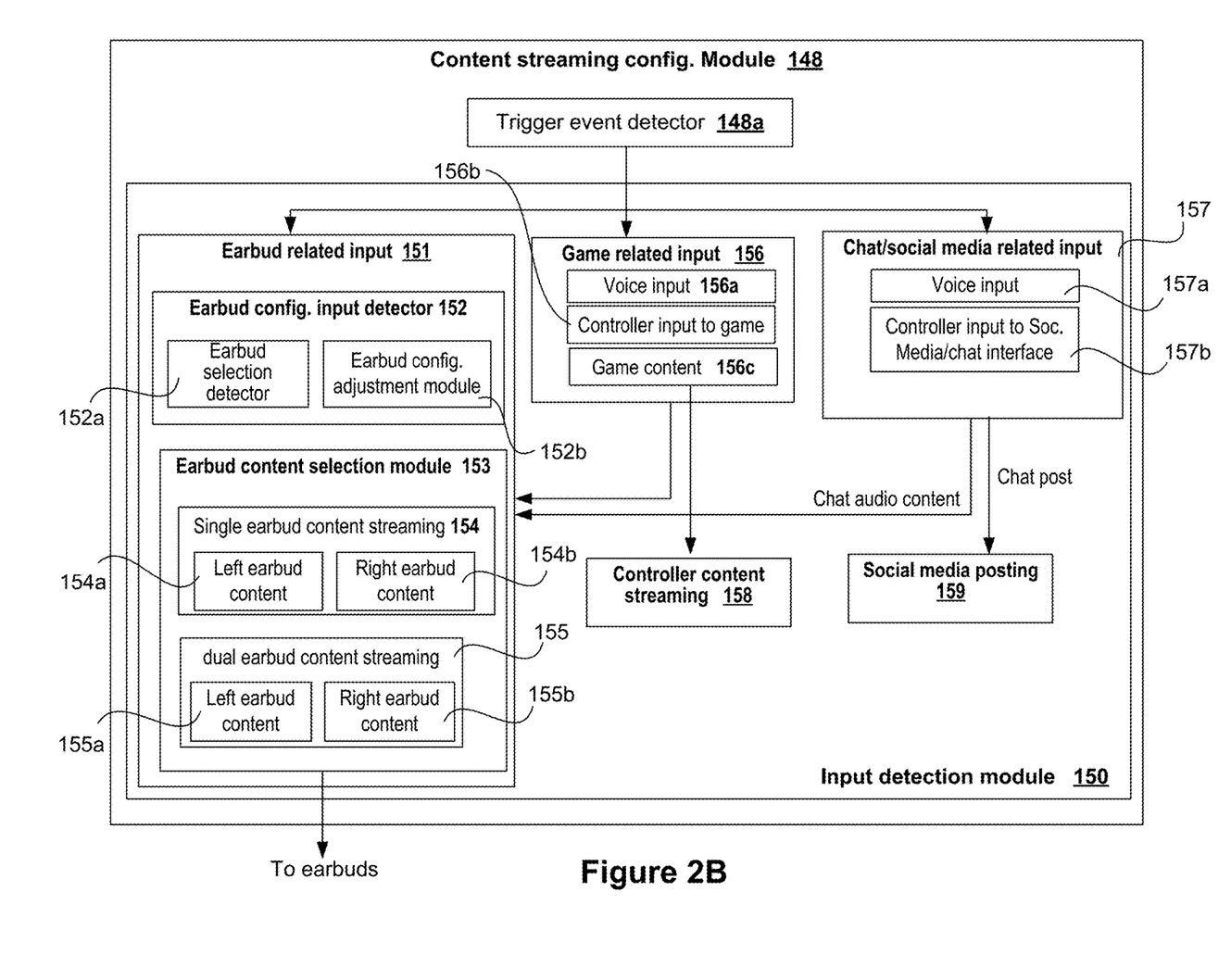
FIG. 2B illustrates a simplified block diagram of various modules included in a content streaming configuration module of FIG. 2A, in one implementation.

FIG. 2A illustrates various modules of an earbud setup module 140 used to set up and manage earbuds 120 integrated with the controller 110, in some implementations. The earbud setup module 140 may be software (i.e., program instructions) stored in memory 114 of the controller 110 and executed by a processor 113 of the controller 110, or may be a firmware. FIG. 2B illustrates additional sub-modules within content streaming configuration module 148 of the earbud setup module 140 that can be used to manage streaming of the different audio content to different devices, in some implementations. Referring simultaneously to FIGS. 2A and 2B, the processor 113 of the controller 110 receives sensor data from one or more sensors 147 defined on the controller 110. In some implementations, some of the sensors 147 may be embedded inside each slot 130 to detect the presence of the earbuds in the respective slot. Additional sensors may be provided along the opening surface of the slots 130, other surfaces of the controller 110, and and in the earbuds 120 itself. The sensor data thus can be used to detect location of the earbud 120, proximity of the earbud 120 to one or more facial features of the user, pairing data related to the controller 110 and the earbuds 120, etc. The sensor data is received and interpreted by the earbud detection module 142 of the earbud setup module 140 to determine at least, (a) identification information of the controller 110 and the earbuds 120, (b) if one or both the earbuds 120 are received in the respective slot(s) 130, and (c) if one or both the earbuds 120 are being worn by the user. The sensor data is provided as input to a pairing module 144 of the earbud setup module 140. In addition to the location information, in some implementations, the sensor data may also be used to determine the battery life statuses of the controller 110 and the earbuds 120.

The pairing module 144 receives the sensor data provided by the earbud detection module 142 and identifies the controller 110 and the earbuds 120 using the identification information. In addition to identifying the controller 110 and the earbuds 120, the sensor data is used to determine if the controller 110 is paired to the computing device 100, and if the earbuds 120 are paired to the controller 110. The pairing module 144 engages a controller-to-computer device pairing module 144a to query a database (not shown) associated with the controller 110 to determine if the controller 110 is already paired to the computing device 100. If the controller 110 is not already paired to the computing device 100, the controller-to-computer device pairing module 144a initiates a pairing process between the controller 110 and the computing device 100. In some implementations, the controller 110 is paired to the computing device 100 by establishing a high speed communication connection and the pairing information is uploaded to the database. The communication connection may be wired or wireless. If, on the other hand, the controller 110 is already paired to the computing device 100, the controller-to-computer device pairing module 144a returns the pairing information to the pairing module 144.

Once the pairing between the controller 110 and the computing device 100 is established/verified, the pairing module 144 then engages an earbud-to-controller pairing module 144b to verify if the earbuds 120 received in the slots 130 are associated with the controller 110, and whether the earbuds 120 are already paired with the controller 110. The earbud-to-controller pairing module 144b queries the database of the controller 110 to obtain any earbud information associated with the controller 110. If the query returns any earbud information, then the earbud-to-controller pairing module 144b verifies to see if the earbud information returned for the query matches the earbud information of the earbuds 120 received in the slots 130. If no record is returned for the query, the earbud-to-controller pairing module 144b initiates the pairing process between the controller 110 and the earbuds 120 received in the slots 130. As part of the earbud pairing process, the pairing between the controller 110 and the computing device 100 is shared with the earbuds 120. Thus, by merely pairing the earbuds 120 with the controller 110, the earbuds 120 are able to take advantage and make use of pairing between the computing device 100 and the controller 110 for communicating with the computing device 100. Upon successful pairing of the earbuds 120 with the controller 110, the earbud pairing information including the earbud identification information is updated to the database of the controller 110 for storing and for subsequent verification. If, however, a pairing record detailing pairing of earbuds 120 to the controller 110 is returned for the query, the earbud information of the earbuds 120 received in the slots 130 of the controller 110 is verified against the earbud information received in the pairing record for the controller 110 for the query. If there is a mismatch between the earbud information retrieved from the database and the earbud information pertaining to the earbuds 120 in the slots 130, the earbud-to-controller pairing module 144b returns an error message to indicate that the earbuds 120 received in the slots 130 are not related to the controller 110. The error message is returned for rendering on the display screen 115 and the pairing process between the earbuds 120 and the controller 110 ends. If, however, there is a match in the earbud information retrieved from the database to the earbud information of the earbuds 120 in the slots 130, then it indicates that the earbuds 120 have already undergone the pairing process to pair with the controller 110. In such cases, the earbud-to-controller pairing module 144b returns a successful match signal to the pairing module 144. Upon successful verification of the pairing between the earbuds 120 received in the slots 130 and the controller 110, the pairing module 144 forwards the pairing information of the earbuds 120 to a charging module 146 of the earbud setup module 140.

The charging module 146 is used to verify if the controller 110 and the earbuds 120 are fully charged and are ready for use for interacting with the video game, for example. The charging module 146 engages a controller charging module 146a that is configured to check the battery status of the controller 110 (i.e., charge status to determine if the controller 110 is fully charged, partially charged or has no charge). Based on the charge status, the controller charging module 146a may either initiate the charging process to allow the controller 110 to get charged or return an appropriate signal/message indicating the charge status of the controller 110.

Responsive to the charging module 146 receiving the appropriate signal (fully charged or sufficiently (e.g., about 75-90%) charged) from the controller charging module 146a, the charging module 146 engages the earbud charging module 146b to check the battery status of the earbuds 120 received in the slots 130. Based on the charge status (i.e., battery status) of the earbuds 120 received in the slots 130, the earbud charging module 146b is engaged to either initiate the earbud charging process to charge the earbuds 120 using the power source (111 or 112) of the controller 110 or return an appropriate signal/message indicating the earbuds 120 are sufficiently charged. It is to be noted that the pairing and the charging processes are initiated for the earbuds in response to detecting the earbuds 120 in the slots 130 of the controller 110. The detection of the earbuds 120 in the slots 130 of the controller 110 can be verified using sensor data provided by the one or more sensors 147 disposed in the slots 130, on the surface of the opening to the slots 130, on the surface(s) of the controller 110 and on the earbuds 120. For instance, when the earbuds 120 are placed into the slots 130 equipped with a spring-fit mechanism, and pushed into place, a mechanical click can occur to indicate that the earbuds 120 have been properly received into the slots 130. The occurrence of the mechanical click and the sensor data provided by the sensors 147 can be used to confirm the presence of the earbuds 120 in the slots 130. The mechanical click can be a trigger event that can be used to initiate the verification of the pairing and charging of the controller 110 and the earbuds 120.

Upon successful pairing and charging of the controller 110 and the earbuds 120, the earbud setup module 140 engages the content streaming configuration module 148 to determine how the audio content generated during the game play of the video game is to be streamed. In some implementations, the earbud setup module 140 engages the content streaming configuration module 148 as part of the earbud setup or in response to a trigger event. In response to the trigger event, a trigger event detector 148a is engaged by the content streaming configuration module 148 to evaluate the trigger event to determine if the trigger event relates to the earbuds 120. The trigger event may occur during game play of the video game, for example, and may be triggered in response to detecting the user wearing one or both the earbuds 120. Sensor data collected from the sensors 147 disposed in the slots 130, on the surface of the earbuds, on the surface of the openings of the slots 130, and on the surface of the controller 110 are used to verify the location of the earbuds 120. The sensor data also provides the details of whether only one earbud 120 or both the earbuds 120 are worn by the user and whether one earbud 120 or both the earbuds 120 are in the slot 130. The content streaming configuration module 148 is configured to use the sensor data and the trigger event data to stream appropriate content generated during the game play of the video game (i.e., interactive application) to the different devices for rendering. The content streaming configuration module 148 first determines the different audio content generated during the game play of the video game. As noted, the audio content can include game audio, chat audio (i.e., social media audio), and voice input. The game audio is audio generated by game logic and provided for rendering during game play. The chat audio is provided by other users on a chat interface rendered alongside the game content. The voice input is generated by the user and can include input commands to affect the game state of the video game or can be chat audio for rendering on the chat interface.

The content streaming configuration module 148 can identify, isolate, and extract select ones of the audios generated during game play and stream the select ones of the audio content to the appropriate devices. The audio content generated during game play includes game audio, chat (i.e., social media) audio, voice inputs, to name a few. Each of the computing device 100, the controller 110, the display screen 115 and the earbuds 120 can include microphones and speakers embedded within or associated with them to render and receive the audio content during game play of the video game. In some implementations, the configuration of the various devices may be provided by device manufacturers and can be dynamically updated by a user during use of the devices. In alternate implementations, the configuration of the various devices can be controlled by the user and dynamically updated during use. User inputs provided at or for updating the configuration of the different devices are received, interpreted and used to update the configuration of the respective devices. In some implementations, the configuration of the various devices can be device-specific, user-specific and/or interactive application specific.

In some implementations, during the initial setup (i.e., during pairing) of the various devices, the devices may be configured to receive the game audio stream at the controller 110 or the computing device or the display screen 115 for rendering through the associated speaker(s) (i.e., the game audio being rendered for public consumption). The earbud(s) 120 may be configured to receive chat audio stream for rendering via the speakers of the earbuds 120 upon detecting a user is wearing the earbud(s) 120 (i.e., the chat audio being rendered for private consumption of the user) during game play of the video game. When the user is not wearing the earbuds 120, then the chat audio can be configured to be streamed to the controller 110, computing device 100 or the display screen 115 for rendering through the respective speakers. In this case, the device to which the chat audio is streamed might be different from the device to which the game audio is streamed.

In some implementations, the earbuds can be configured differently for single earbud use and dual earbud use. In some implementations, the earbuds 120 are configured such that when the user is wearing only one earbud 120, the chat audio is streamed to that earbud 120, and when the user is wearing both the earbuds, the chat audio is streamed to both the earbuds 120. In the case where the user is wearing both the earbuds and the chat audio is being streamed to both the earbuds 120, when the user shares one of the earbuds (either left earbud 120-L or right earbud 120-R) with a second user, then the audio content streamed to the earbuds 120 are updated such that the earbud (120-L or 120-R) shared with the second user is configured to receive the game audio and the earbud (120-R or 120-L) worn by the user is configured to receive the chat audio. This configuration allows the user to continue to enjoy the chat audio privately while dynamically switching the chat audio to the game audio forwarded to the earbud shared with the second user. Alternately, the audio content streamed to the earbud shared with the second user can continue to stream the chat audio so that both the user and the second user can listen to the chat audio. In alternate implementations, when the user is wearing both the earbuds 120, both the earbuds 120 may be configured to render the game audio. In such case, when the user shares one of the earbuds (either 120-L or 120-R) with the second user, both the earbuds (120-L, 120-R) can be configured to receive and render the game audio so that the user and the second user can enjoy the game audio.

The content streaming configuration module 148 can obtain the configuration of the computing device 100, the controller 110, the display screen 115 and the earbuds 120, from the initial setup of each of these devices and direct the audio content accordingly. Once the configuration of the various devices have been completed, the content streaming configuration module 148 identifies, extracts, and streams appropriate audio content generated during the game play of the video game to the different devices. For example, earbud related input is identified, extracted and forwarded to the appropriate earbuds or the controller 110/computing device 100 using the earbud related input module 151. Similarly, the game related input is identified, extracted and forwarded to the controller 110 or the computing device using the game related input module 156, and the chat/social media related input is extracted and forwarded to the display screen 115 using the chat/social media related input module 157 for rendering.

FIG. 2B illustrates the various sub-modules of the content streaming configuration module 148 that are used to identify, extract and forward appropriate audio content to the different devices, to the video game to affect the game state, and to a social media interface for rendering. A trigger event detector 148a is engaged to detect and analyze any trigger event generated during game play of the video game. The trigger event can be generated in response to an input received from the user, or in response to input from the video game providing game content, or in response to chat content received from the chat interface. The user can provide inputs to select and adjust configuration of either one or both the earbuds or to provide voice inputs, wherein the voice inputs can be voice command to affect an outcome of the video game, or chat or social media content for posting on a chat or social media interface that is rendering alongside the video game. Based on the analysis, the content from the video game or input from the user is processed by the different sub-modules of the content streaming configuration module 148.

The input is processed by the input detection module 150 to identify the source and the context of the input and classify the input so as to take appropriate actions. The input can be one or more finger taps at the opening of a slot (130-L or 130-R) and the input can be processed by the input detection module 150 to interpret the input as a selection action of an earbud (120-L or 120-R) received in said slot. Additionally, the finger taps at the slot can be interpreted to determine presence or absence of the earbud in the slot and trigger a pairing action or a charging action. Alternately, the finger taps at the slot can be interpreted as a selection of the earbud associated with the slot for forwarding specific one of audio content. Similarly, the input can be button presses on the controller 110 and the input can be interpreted to perform specific actions at the interactive application based on the actions configured for each button selected. The input can be broadly classified into earbud related input, game related input, and chat/social media related input. The earbud related input can include input received for rendering, for forwarding or for configuring the earbuds. For example, the user input can be provided using the one or more control buttons and/or touch screen interface of the controller 110, or using the microphones of the earbuds, or at the surface of the openings to the slots 130. The earbud configuration input detector 152 is engaged to process the configuration related input. For example, selection of one or both earbuds 120 (e.g., left or right earbud (120-L, 120-R)) is detected by earbud selection detector 152a, and input to adjust the streaming, volume, sensitivity, or other configuration settings of the selected earbud(s) is processed by the earbud configuration adjustment module 152b. A visual indication of selection of the particular earbud may be provided to the user by lighting up the appropriate slot (e.g., right or left slot (130-L, 130-R)) associated with the selected earbud(s) at the controller 110 or rendering an image of the selected earbud(s) 120 on the display screen 115, or providing haptic feedback on the relevant side of the controller 110, etc. The earbud related input can be provided at any time before, during or after the game play of the video game, for example, and the configuration setting adjusted for the earbud(s) 120 for subsequent use of the earbud(s) 120.

The earbud content selection module 153 is engaged to identify the appropriate audio content that is to be streamed to each earbud 120 for rendering, based on the earbuds' configuration and based on whether the user is wearing one or both earbuds 120. As shown in FIG. 2B, the earbud(s) 120 can receive game audio provided by the game content module 156c or chat audio provided by the chat content module 157c for rendering through speakers defined in each earbud 120. Additionally, the earbuds can include microphones to receive voice input/commands from the user wearing the earbuds 120 and provide the same as input to the video game or to the chat/social media interface for posting. Thus, based on the configuration setting of the earbuds 120 and upon detecting the user wearing one or both earbuds on their ears, the game audio or the chat audio is rendered to the one earbud (120-L or 120-R) or both earbuds 120. A single earbud content streaming module 154 is activated when the user is detected to be wearing only one earbud 120. The detection of the user wearing only one earbud can be determined from sensor data that provides data related to the presence or absence of the earbud 120 in the corresponding slot 130 and the proximity of the earbud to one or more facial features of the user. Based on the configuration setting of each earbud 120, the game content or the chat content is selectively extracted and streamed to the appropriate earbud by the single earbud content streaming module 154. If the user is wearing only the left earbud 120-L and the configuration setting indicates that the left earbud 120-L is to receive and render only the chat audio, the left earbud content module 154a is engaged to activate the speaker(s) of the left earbud 120-L and the single earbud content streaming module 154 extracts and forwards the chat audio for rendering via the left speaker. Similarly, if the user is detected to be wearing only the right earbud 120-R and the configuration setting indicates that the right earbud 120-R is to receive only the game audio, the right earbud content module 154b is engaged to activate the speaker(s) of the right earbud 120-R and the single earbud content streaming module 154 extracts and forwards the game audio for rendering via the right speaker.

A dual earbud content streaming module 155 is activated when the user is detected to be wearing both the earbuds 120. As with the single earbud content streaming, based on the configuration setting of each earbud 120, the game audio or the chat audio is selectively extracted and streamed to the appropriate earbud 120 (e.g., 120-L for game audio and 120-R for chat audio). Thus, based on the configuration setting, dual earbud content streaming module 155 receives and renders only the chat audio to the left earbud 120-L and only the game audio to the right earbud 120-R, or the chat audio to both the earbuds (120-L, 120-R) or the game audio to both the earbuds (120-L, 120-R).

Similarly, a game related input module 156 is used to identify the source and the type of input generated for or by the game (i.e., interactive application). The game related input can be provided via the control buttons, or touch screen interface of the controller 110 or can be voice commands provided through the microphone of the controller 110, or voice input provided by the user through the microphones of the controller 110 or the earbuds 120. Alternately, the game input can be game content generated by the video game, in response to the inputs provided by the user (for a single-user game) or a plurality of users including the user (for a multi-user game). The game related input can include text input, voice input, control button and/or touch screen input provided by the user, as well as content generated by the video game, such as video content, audio content, haptic content, etc. The voice input module 156a is used to detect and process the voice input and forward the processed voice input to the game logic as game input to affect the game state of the video game. Similarly, input provided through the controller 110 (i.e., through control buttons or touch screen (input) interface) is processed by the controller input to game module 156b and forwarded to the game logic as game input to affect the game state of the video game. The game logic updates the game state of the video game using the inputs and generates game content. The generated game content includes at least the audio portion and the video portion. The audio portion is extracted and forwarded to the earbud content selection module for rendering at the respective earbuds 120 or to the controller content streaming module 158. The audio portion can be rendered via the speakers of the controller 110 or can be forwarded to the computing device for rendering through the speakers associated with the computing device 100 or the display screen 115. The video portion of the game content is forwarded to the display screen 115 for rendering.

The chat/social media related input module 157 is used to detect content generated for rendering at a chat or social media interface or for providing to a user. The chat related input can include voice input provided by the user through the microphones of the earbuds 120 or the controller 110, or textual or other controller input provided by the user using the control buttons, and/or touch screen interface of the controller 110. The voice input module 157a of the chat/social media related input module 157 is used to detect and process the voice input and forward the processed voice input to the social media posting module 159 for posting as chat audio on a chat/social media interface. Chat content provided by other users can be similarly processed by the chat/social media related input module 157 to extract the chat audio included in the chat content and forward the chat audio to one or both the earbuds 120 for rendering, based on the configuration of the earbuds 120. The chat related controller input is similarly processed using the controller input to social media/chat interface module 157b and forwarded to the social media posting module 159 for posting on the chat/social media interface.

As previously noted, the various modules of the earbud setup module 140 shown in FIGS. 2A and 2B and the content streaming configuration module 148 of FIG. 2B, the controller 110 with the integrated earbuds 120 is a self-contained, versatile device that simplifies the pairing, charging, the communication processes and reduces number of devices for tracking the location and battery statuses. Further, the earbuds 120 can use the high speed communication connection established between the controller and the computing device for communicating with the computing device thereby providing a low-latency communication between the earbuds and the computing device.

Figure 3A:
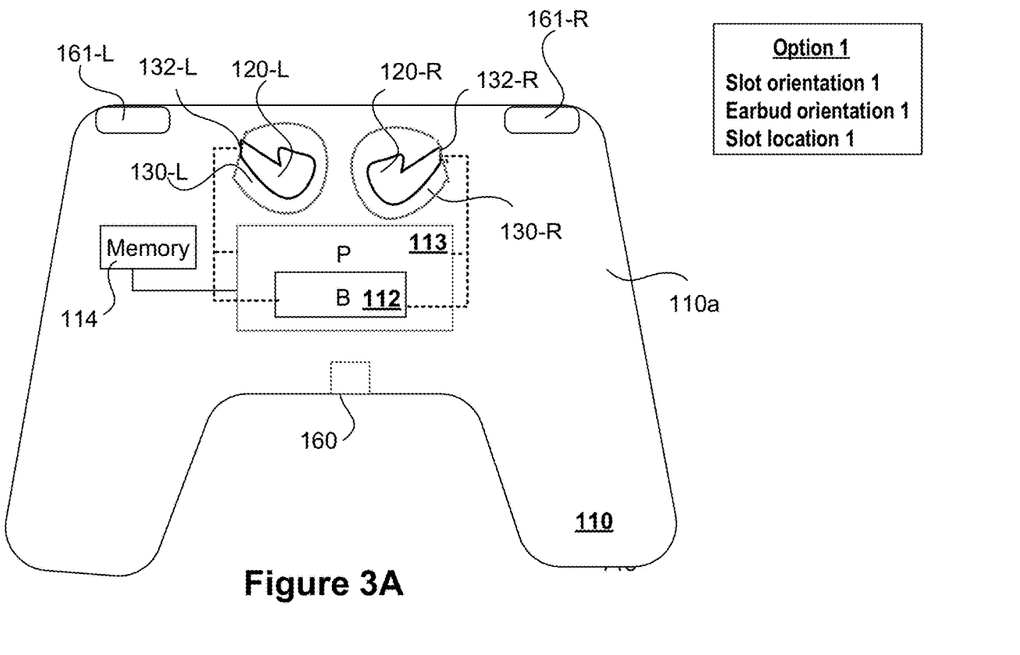
FIG. 3A illustrates a view of a back side of the controller on which an earbud case for receiving and storing earbuds is defined thereon, in accordance with one implementation of the present disclosure.

FIGS. 3A-3E illustrate the various orientations and locations of the slots for the earbuds defined on the controller, in some implementations. FIG. 3A illustrates a back side of the controller on which the slots for the earbuds are defined. As shown, a left slot to receive a left earbud and a right slot for receiving a right earbud are defined on the back side of the controller proximate to a top surface. Metal contacts (i.e., slot contacts) are defined in the portion of each slot where the bottom of the narrow tubular portion of each earbud is received. The bottom of the narrow tubular portion of each earbud includes metallic conductor elements that contact the slot contacts defined in each slot, when the earbud is received in the respective slot. The slot contacts of each slot are coupled to a power source, such as the battery or an external power source, of the controller. The slots are also coupled to a processor of the controller to execute program instructions stored in memory. The program instructions are configured to allow the processor to detect, pair and charge the earbuds received in the slot and to direct specific ones of audio content generated during execution of an interactive application at the computing device communicatively coupled to the controller. The slots for the earbuds are oriented sideways. Thus, in a first configuration illustrated in FIG. 3A, the slots to store the earbuds are defined at slot location 1 (i.e., proximate to the top surface) and have a slot orientation 1 to receive the earbuds at earbud orientation 1.

Figure 3B:
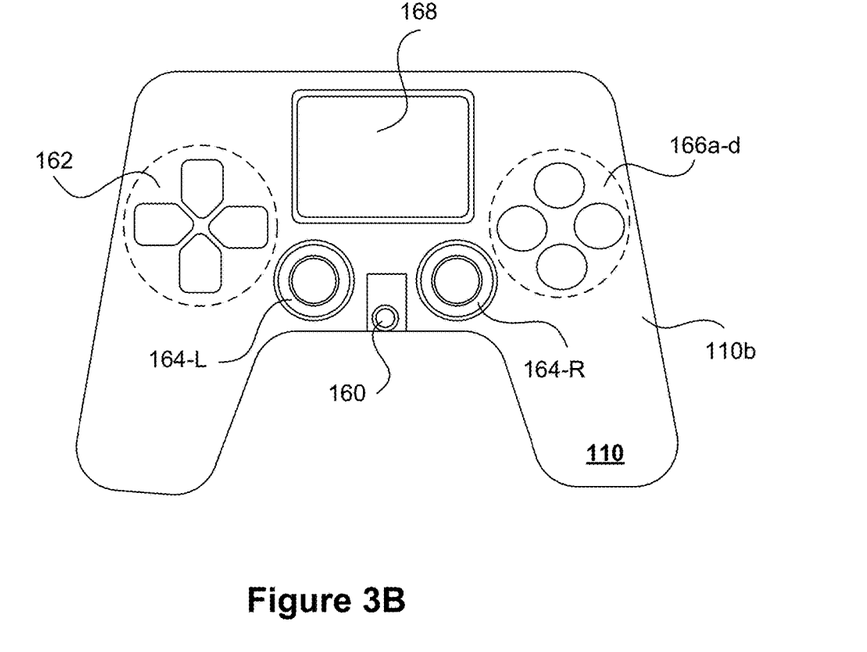
FIG. 3B illustrates a front side of the controller on which a plurality of buttons and an input interface are defined, in accordance with one implementation of the present disclosure.

FIG. 3B illustrates the front side of the controller, in some implementations, on which a plurality of control buttons and one or more touch screen interfaces are disposed. Some of the control buttons that may be disposed include Trigger buttons, bumpers, directional pad with appropriate buttons to provide directional inputs, analog sticks, a guide button, a headphone jack 160 for wired connection, buttons to provide options, start, share, back button, and/or additional control buttons (162, 164-L, 164-R, 166a-d, 161-R, 161-L) to provide additional inputs. The controller also includes a touchpad (i.e., a touch screen interface) 168 for providing inputs using finger presses and finger slides. It noted herein that the control buttons and the touch screen interfaces shown in FIG. 3B can be typical buttons/touch input interfaces that are included in any type of controller used to provide inputs to interactive applications.

Figure 3C:
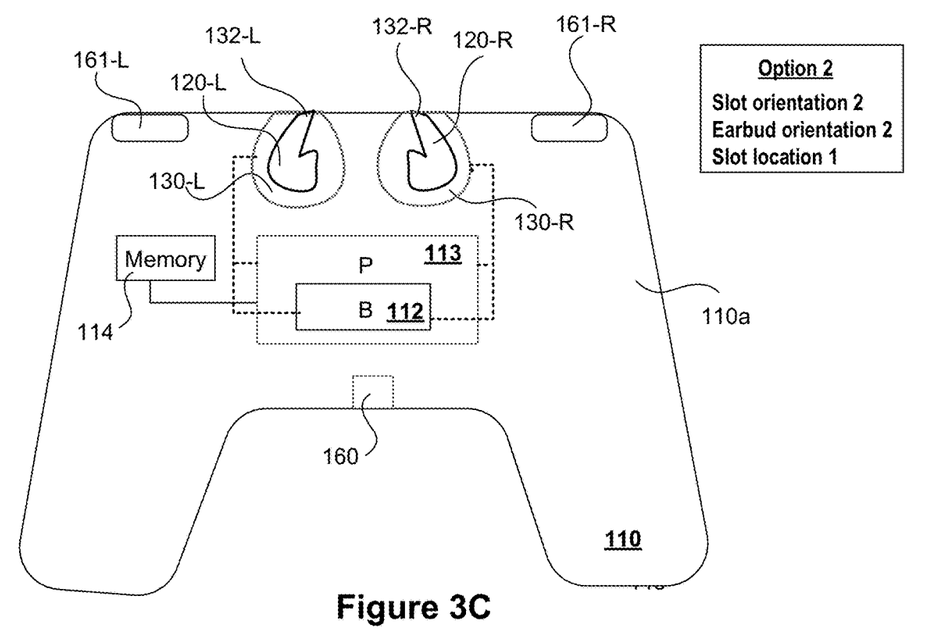
FIG. 3C illustrates an alternate configuration of the earbud storage defined on the back side of the controller that is different than the configuration shown in FIG. 3A, in accordance with one implementation of the present disclosure.

FIG. 3C illustrates a second configuration for defining the slots that is different from the configuration illustrated in FIG. 3A, in some alternate implementations. In these implementations, the slots and the earbuds received therein are defined at slot location 1, have a slot orientation and earbud orientation 2, which are perpendicular to the top surface.

Figure 3D:
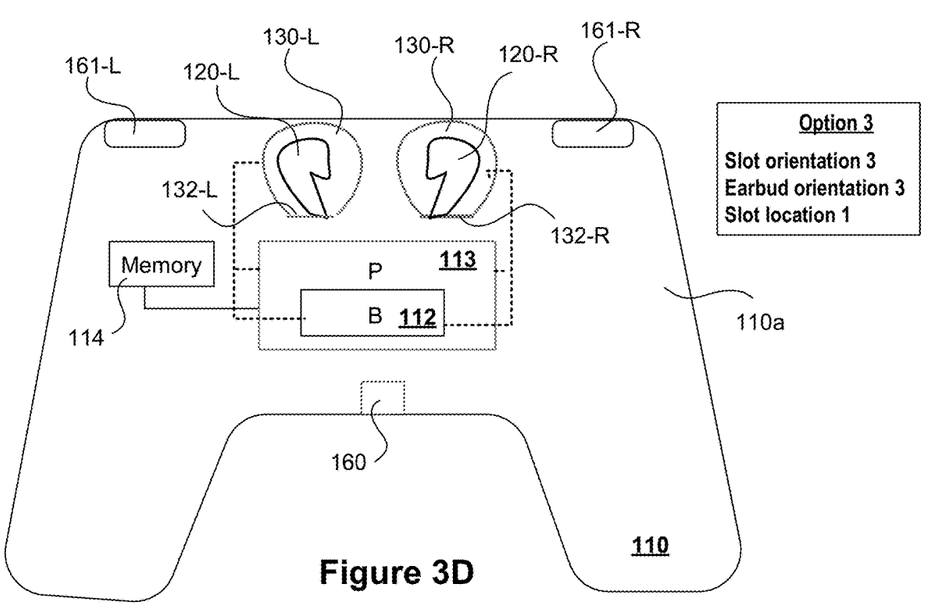
FIG. 3D illustrates another alternate configuration of the earbud storage defined on the back side of the controller that is different than the configurations shown in FIGS. 3A and 3C, in accordance with one implementation of the present disclosure.

FIG. 3D illustrates a third configuration for defining the slots that is different from the configuration illustrated in FIGS. 3A and 3C, in some alternate implementations. In these implementations, the slots and the earbuds received therein are defined at slot location 1, and have slot orientation and earbud orientation 3, which are perpendicular to the top surface. The orientation of the slots 130 and the earbuds 120 in FIG. 3D are opposite to what is shown in FIG. 3C.

Figure 3E:
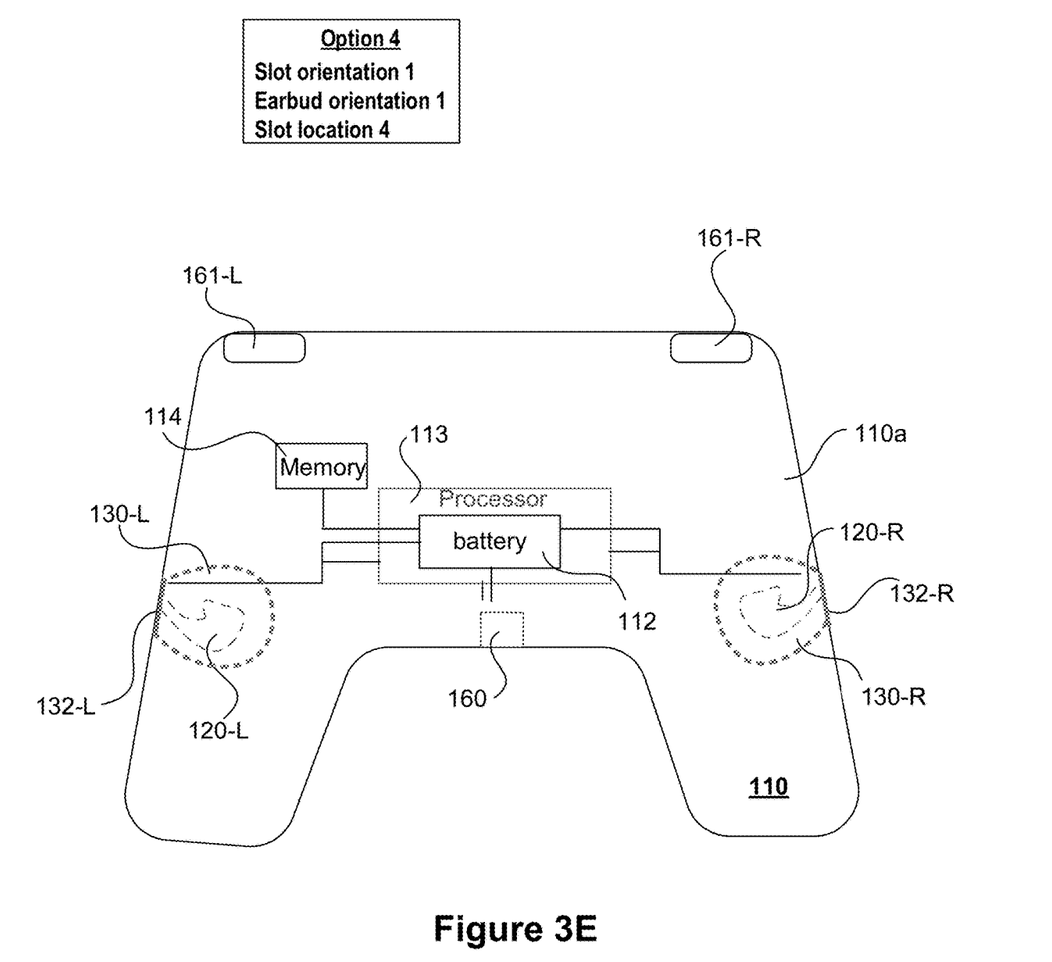
FIG. 3E illustrates a different configuration of the earbud storage defined on the back side of the controller that is different than the configurations shown in FIGS. 3A, 3C and 3D, in accordance with one implementation of the present disclosure.

FIG. 3E illustrates a fourth configuration for defining the slots that is different from the slot configurations illustrated in FIGS. 3A, 3C and 3D, in some implementations. In these implementations, the slots are defined at location 4 along an outer edge of the lateral sides of the controller such that the bottom of the slot is defined to align with the outer edge of the lateral sidewalls. The slots 130 and the earbuds 120 have a slot orientation and earbud orientation 1. It is to be noted that the location and orientation of the slots (i.e., slot configuration) for receiving the earbuds are provided as mere examples and should not be considered restrictive and that other orientations, surfaces, and locations can also be envisioned.

It should be noted that the computing device can communicate with the controller and with other computing devices that are located remotely or are part of a cloud gaming site over a network, which can include local area network (LAN), wide area network, cellular network (e.g., 4G, 5G, etc.) or any other type of data network, including the Internet 300 and such communication can be through wired or wireless connection. Embodiments of the present disclosure may be practiced with various computer system configurations including hand-held devices, microprocessor systems, microprocessor-based or programmable consumer electronics, minicomputers, mainframe computers, mobile devices, and the like. Embodiments of the present disclosure can also be practiced in distributed computing environments where tasks are performed by remote processing devices that are linked through a wire-based or wireless network. One or more embodiments can also be fabricated as computer readable code on a computer readable medium. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A controller used to provide inputs to an interactive application, comprising:
   a first surface with a pair of slots defined thereon, each slot of the pair of slots configured to store an earbud, wherein said each slot is coupled to a power source of the controller to charge said earbud when received in said each slot of said pair of slots;
   a plurality of control buttons and one or more touch input surfaces defined on one or more surfaces of the controller, wherein the one or more surfaces includes said first surface and wherein the one or more touch input surfaces includes a distinct touch input surface defined on a surface of an opening of said each slot and configured to detect user input, each of the plurality of control buttons and each of the one or more touch input surfaces configured to provide an input for performing an action in the interactive application; and a processor coupled to each of the slots and configured to execute program instructions to pair the earbud received therein to the controller and to charge the earbud using the power source of the controller, the pairing of the earbud allows the earbud to share a pairing between the controller and a computing device executing the interactive application to communicate with the computing device.

2. The controller of claim 1, wherein each slot includes one or more sensors to detect presence of said earbud in said slot, wherein the distinct touch input surface at the opening of said each slot is equipped with one or more sensors to detect said user input, and wherein the processor is configured to receive said user input provided at the distinct touch input surface of the opening and interpret the user input to perform an action associated with the earbud, wherein the action is a pairing action, or a charging action, or forwarding action directing audio content to said earbud for rendering.

3. The controller of claim 1, further includes memory to store the program instructions executed by the processor of the controller.

4. The controller of claim 1, wherein the pair of slots is defined such that a size and a shape of each slot in said pair is defined to allow the earbud, when received therein, to fit within said slot and be flush with the first surface.

5. The controller of claim 1, wherein each slot includes one or more metal contacts that are coupled to the power source of said controller, each earbud of the pair includes metallic conductor elements to connect with the one or more metal contacts in respective slot, when said earbud is received in said slot, said connection allowing the earbud to receive power from said power source of the controller and get charged.

6. The controller of claim 1, wherein each slot is equipped with a spring-fit mechanism for aligning and securely holding the earbud in said slot, and wherein the spring-fit mechanism is configured such that a first press of the earbud, when the earbud is aligned over said slot, causes the earbud to snap into place within the slot and a second press of the earbud causes the earbud to pop out of the slot.

7. The controller of claim 1, wherein said pairing between said controller and said computing device is a high speed communication connection, and each earbud of the pair adopts the high speed communication connection of the controller to communicate with the computing device, and wherein each earbud of the pair is coupled to the controller using wireless connections.

8. The controller of claim 1, wherein audio generated during execution of the interactive application includes any one or combination of interactive audio content and chat content received from said interactive application, and voice inputs received from user wearing one or more earbuds of the pair, and wherein said program instructions are configured to selectively extract and direct specific ones of said audio to one or both earbuds of the pair, or to the controller or to the computing device for rendering.

9. The controller of claim 8, wherein said program instructions are configured to direct said interactive audio content generated during execution of the interactive application to a first earbud and said chat content generated during execution of the interactive application to a second earbud.

10. The controller of claim 8, wherein said program instructions are configured to direct said interactive audio content generated during execution of the interactive application to the controller and said chat content to one or both earbuds of the pair for rendering.

11. The controller of claim 8, wherein said program instructions are configured to process the audio content generated during execution of the interactive application to identify, extract and transmit voice inputs to the interactive application to affect state of the interactive application or to a chat interface to post the voice inputs as chats.

12. The controller of claim 1, wherein each earbud of the pair includes a speaker to render audio generated during execution of the interactive application.

13. The controller of claim 12, wherein each earbud of the pair includes a microphone to receive voice inputs from a user wearing the earbuds and to transmit the voice inputs to the controller, wherein the processor of the controller is configured to process the voice inputs and transmit to the computing device for rendering as input audio.

14. The controller of claim 1, wherein said first surface of the controller is a back side of the controller, and wherein said one or more surfaces includes a front side, one or more lateral sides and the back side of the controller.

15. The controller of claim 1, wherein said first surface of the controller is a lateral side of the controller, and wherein said one or more surfaces includes the front side, one or more lateral sides and a back side of the controller.

16. The controller of claim 1, wherein the controller includes one or more microphones and one or more speakers embedded therein, said one or more microphones and said one or more speakers coupled to said power source and to the processor of the controller.

17. The controller of claim 1, wherein said controller is coupled to the computing device via wired or wireless connection.

18. The controller of claim 1, wherein the controller includes one or more handles for holding the controller when providing inputs to said interactive application.

19. A system for executing an interactive application, comprising:

a computing device for executing an instance of the interactive application, the interactive application generating streaming content for rendering, the streaming content including at least an audio portion and a video portion;

a display screen associated with the computing device for rendering the video portion of the streaming content;

a controller for providing input during execution of the interactive application, the controller including, a first surface with a pair of slots defined thereon, each slot of the pair of slots configured to store an earbud, wherein each slot is coupled to a power source of the controller to charge said earbud received therein, wherein said power source is used to charge the controller;

a plurality of control buttons and one or more touch input surfaces defined on one or more surfaces of the controller, wherein the one or more surfaces includes said first surface and wherein the one or more touch input surfaces includes a distinct touch input surface defined on a surface of an opening of said each slot, the distinct touch input surface at the opening of said each slot equipped with one or more sensors to detect user input, each of the plurality of control buttons and each of the one or more touch input surfaces configured to provide an input for performing an action in the interactive application;

a memory to store program instructions for setting up earbuds stored in said pair of slots; and a processor to execute said program instructions retrieved from memory for setting up the earbuds.

20. The system of claim 19, wherein the program instructions are configured to, detect presence of said earbud in a slot of the pair of slots;

initiate charging of the earbud using the power source of the controller;

verify the controller is paired with the computing device;

initiate a pairing of the earbuds with the controller, the pairing of the earbuds allowing the earbuds to share the pairing of the controller with the computing device, so as to communicate with the computing device, upon successful pairing of the earbuds with the controller;

detect presence of said earbud on the user; and identify, extract and stream select ones of the audio portion of the streaming content to said earbud, based on configuration of said earbud.

* * * * *